(12) United States Patent
Fan et al.

(10) Patent No.: US 10,673,088 B2
(45) Date of Patent: Jun. 2, 2020

(54) SYSTEM AND METHOD FOR PRODUCING 3.5-VALENCE HIGH-PURITY VANADIUM ELECTROLYTE

(71) Applicants: INSTITUTE OF PROCESS ENGINEERING, CHINESE ACADEMY OF SCIENCES, Beijing (CN); BEIJING ZHONGKAIHONGDE TECHNOLOGY CO., LTD, Beijing (CN)

(72) Inventors: Chuanlin Fan, Beijing (CN); Qingshan Zhu, Beijing (CN); Haitao Yang, Beijing (CN); Wenheng Mu, Beijing (CN); Jibin Liu, Beijing (CN); Cunhu Wang, Beijing (CN); Qixun Ban, Beijing (CN)

(73) Assignees: INSTITUTE OF PROCESS ENGINEERING, CHINESE ACADEMY OF SCIENCES, Beijing (CN); BEIJING ZHONGKAIHONGDE TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 16/074,075

(22) PCT Filed: Jan. 16, 2017

(86) PCT No.: PCT/CN2017/071207
§ 371 (c)(1),
(2) Date: Jul. 30, 2018

(87) PCT Pub. No.: WO2017/128969
PCT Pub. Date: Aug. 3, 2017

(65) Prior Publication Data
US 2019/0044173 A1     Feb. 7, 2019

(30) Foreign Application Priority Data

Jan. 28, 2016     (CN) .......................... 2016 1 0060093

(51) Int. Cl.
*H01M 8/18* (2006.01)
*B01J 8/00* (2006.01)
(Continued)

(52) U.S. Cl.
CPC .......... *H01M 8/188* (2013.01); *B01J 8/0045* (2013.01); *B01J 8/0055* (2013.01); *B01J 8/1827* (2013.01);
(Continued)

(58) Field of Classification Search
CPC .. B01J 19/00; B01J 19/24; B01J 2208/00743; B01J 2208/00752; B01J 2208/00761;
(Continued)

(56) References Cited

FOREIGN PATENT DOCUMENTS

CN         103606694 A    *   2/2014

OTHER PUBLICATIONS

Machine translation of CN 103606694A published Feb. 26, 2014. (Year: 2014).*

* cited by examiner

*Primary Examiner* — Natasha E Young
(74) *Attorney, Agent, or Firm* — Bayramoglu Law Offices LLC

(57) ABSTRACT

A system and method for producing a 3.5-valence high-purity vanadium electrolyte, comprising hydrolyzing high-purity vanadium oxytrichloride into vanadium pentoxide in a fluidized bed, and reducing vanadium pentoxide into a low-valence vanadium oxide having an average vanadium valence of 3.5 adding water and a sulfuric acid solution under a microwave field applied externally for dissolution at (Continued)

a low temperature, to obtain a 3.5-valence high-purity vanadium electrolyte. The preparation of vanadium pentoxide by means of gas-phase hydrolysis in the fluidized bed is of short process and high efficiency. By providing an internal member within the reduction fluidized bed, the precise regulation of the valence state of the reduction product is achieved, and the special chemical effect of the microwave field is used to promote dissolution of the vanadium oxide and activate the vanadium ions, thereby greatly improving the activity of the electrolyte.

10 Claims, 1 Drawing Sheet

(51) Int. Cl.
*B01J 8/18* (2006.01)
*B01J 8/26* (2006.01)
*C01G 31/02* (2006.01)

(52) U.S. Cl.
CPC ............... *B01J 8/1836* (2013.01); *B01J 8/26* (2013.01); *C01G 31/02* (2013.01); *H01M 8/18* (2013.01); *B01J 2208/00752* (2013.01); *B01J 2208/00761* (2013.01); *B01J 2208/00893* (2013.01); *C01P 2006/80* (2013.01); *H01M 2300/0011* (2013.01); *Y02E 60/528* (2013.01)

(58) Field of Classification Search
CPC .... B01J 2208/00796; B01J 2208/00893; B01J 8/00; B01J 8/0015; B01J 8/0045; B01J 8/005; B01J 8/0055; B01J 8/18; B01J 8/1818; B01J 8/1827; B01J 8/1836; B01J 8/24; B01J 8/26; C01G 31/00; C01G 31/02; C01P 2006/00; C01P 2006/80; H01M 8/00; H01M 8/18; H01M 8/184; H01M 8/188; H01M 2300/00; H01M 2300/0002; H01M 2300/0005; H01M 2300/0008; H01M 2300/0011; Y02E 60/00; Y02E 60/50; Y02E 60/52; Y02E 60/528
See application file for complete search history.

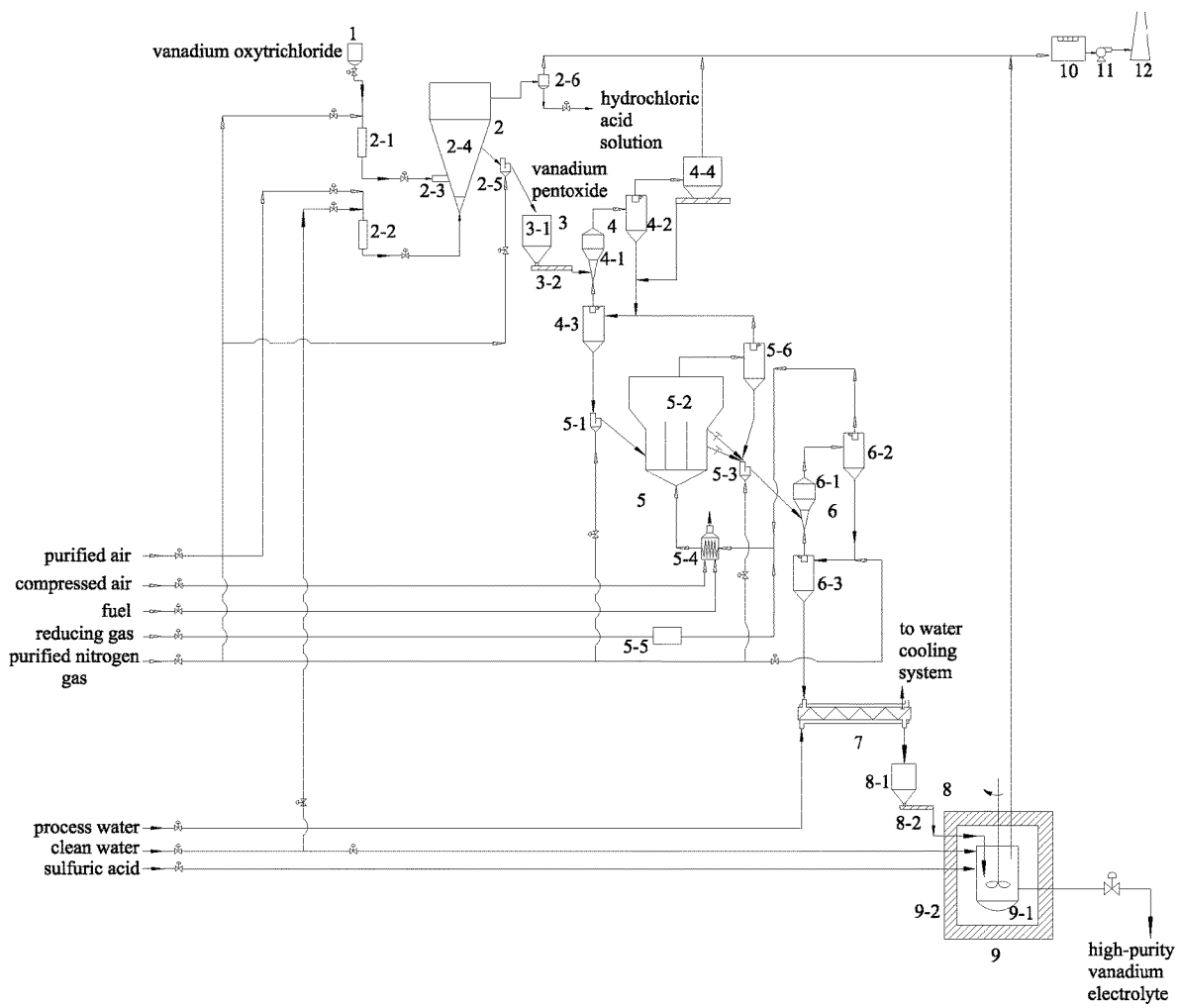

SYSTEM AND METHOD FOR PRODUCING 3.5-VALENCE HIGH-PURITY VANADIUM ELECTROLYTE

CROSS REFERENCE TO RELATED APPLICATIONS

This application is based is based upon and claims priority to PCT Application Number PCT/CN2017/071207, now WO 2017/128969, filed on Jan. 16, 2017, which stems from Chinese Application Number 201610060093.6 filed on Jan. 28, 2016, both of which are incorporated herein by reference in their entirety.

TECHNICAL FIELD

The present invention relates to the fields of energy and chemical engineering, and more particularly to a system and method for producing a 3.5-valence high-purity vanadium electrolyte

BACKGROUND

Traditional fossil fuels have always been the main source of energy, however, long-term exploitation and heavy use results in depletion of resources and also brings about serious environmental pollution. The development and utilization of clean renewable energy sources such as wind, water, solar, and tidal energies have gradually attracted the attention of human society. However, renewable energy sources are difficult to be effectively used by the existing energy management systems due to their inherent intermittence.

Energy storage technology is one of ways to solve such problems. In various kinds of energy storage systems, the all-vanadium redox flow battery (VRB) is an attractive energy storage device. The biggest advantage of VRB is its flexibility—power and energy storage capacity are independent. The power of VRB depends on the number of battery cells and the effective electrode area of battery cells, while the energy storage capacity depends on the concentration of the active material in the electrolyte and the volume of the electrolyte. Each battery cell consists of two electrode chambers (positive and negative electrode chambers) separated by a proton exchange membrane. The electrolyte, that is the sulfate solution of vanadium, is used to store energy. When the electrolyte flows through the battery cell, redox reactions of V(IV)/V(V) and V(II)/V(III) occur in the positive and negative electrode chambers, respectively. The vanadium electrolyte is a vital component of the all-vanadium redox flow battery.

The new vanadium battery stack is generally configured using a mixed vanadium electrolyte with a concentration ratio of V(III) to V(IV) of 1:1, that is, the average valence of vanadium ions in the electrolyte is 3.5. Such electrolyte can be directly added to the positive and negative electrode chambers for use, which is easy to operate. The purity of the vanadium electrolyte plays a crucial role in performances of the battery, and high concentration of impurities in the electrolyte will bring about the following problems: (1) there is a competitive reaction between impurity ions and vanadium ions, which reduces the efficiency of the battery. (2) In the positive electrode chamber, impurity ions are deposited on the graphite felt electrode, which results in the blockage of the gap in the graphite felt and reduction of the specific surface area of the graphite felt, thus affecting charge and discharge efficiencies. (3) In the negative electrode chamber, impurity ions will affect the hydrogen evolution over-potential, and the production of the gas will affect the pressure balance inside the battery. (4) Impurity ions reduce the lifetime of the proton exchange membrane. (5) Impurity ions affect the stability of vanadium ions, leading to premature aging of the electrolyte.

The methods for preparing the VRB electrolyte are as follows: (1) $VOSO_4$ method: U.S. Pat. No. 849,094 discloses a mixed vanadium electrolyte with a concentration ratio of V(III) to V(IV) of 1:1, which is prepared by dissolving $VOSO_4$ in a sulfuric acid solution, and then adjusting the valence state electrochemically. The main problem of this method lies in the more complicated preparation process of $VOSO_4$ and high price, which is not conducive to the large-scale application in VRB. $VOSO_4$ is difficult to be highly purified, thus the electrolyte prepared by such process contains more impurities. Electrochemical treatment is required to adjust the concentration ratio of V(III) to V(IV) to 1:1, so that the average valence of vanadium ions in the electrolyte is 3.5. (2) Chemical reduction method: Chinese patent CN101562256 discloses a mixed vanadium electrolyte of V(III) and V(IV), which is prepared by adding a reducing agent such as oxalic acid, butyraldehyde, etc. to the mixed system of $V_2O_5$ and a sulfuric acid solution, and keeping the mixture at 50-100° C. for 0.5-10 hours for chemical reduction. The main problem of the method lies in that it is not easy to achieve the precise control over the degree of reduction. $V_2O_5$ prepared by the existing process is difficult to be highly purified, and the electrolyte prepared by such process contains more impurities. Addition of the reducing agent will introduce a new impurity into the vanadium electrolyte system, thereby affecting the purity of the electrolyte. (3) Electrolytic method: International PCT patent AKU88/000471 describes a mixed vanadium electrolyte with a concentration ratio of V(III) to V(IV) of 1:1, which is prepared by adding the activated $V_2O_5$ to a sulfuric acid solution, and then performing constant current electrolysis. Preparation of the vanadium electrolyte by the electrolytic method is suitable for large-scale production of the electrolyte, but the process requires a preliminary activating treatment, which needs an additional electrolysis device and consumes electrical energy. Also, there is the problem of the electrolyte containing more impurities. (4) Method by dissolving a low-valence vanadium oxide: Chinese patent CN101728560A discloses that the high-purity $V_2O_3$ is used as a raw material and dissolved in 1:1 dilute sulfuric acid at a temperature of 80-150° C. to prepare a solution of $V_2(SO_4)_3$ used as a negative electrode electrolyte. The main problem of the process lies in that it is operated at a temperature of 80-150° C. (at which temperature the V(III) vanadium ion hydrate is prone to form an oxygen-bridge bond, leading to the production of polycondensation and thus a decreased electrolyte activity), and lacks an activation step. This method can only be used to prepare a negative electrode electrolyte with a narrow application area. Although the industrial high-purity $V_2O_3$ used in the patent has a total vanadium content of 67% (corresponding to a purity of 98.5%), it still contains many impurity ions. Chinese patent CN102468509A discloses a method for preparing a vanadium battery electrolyte, which comprises: preparing $V_2O_3$ by segmented calcination at 200-300° C. and 600-700° C. with ammonium metavanadate and ammonium bicarbonate as raw materials, dissolving $V_2O_3$ in a dilute sulfuric acid and reacting for 5-20 hours at 50-120° C. to obtain a $V_2(SO_4)_3$ solution, and dissolving $V_2O_5$ in the $V_2(SO_4)_3$ solution and reacting for 1-3 hours at 80-110° C. to obtain a vanadium battery electrolyte with an average vanadium ion valence of 3.5. The $V_2(SO_4)_3$ solution is prepared as the negative electrode electrolyte in this patent. The main problem of the method lies in the long-time dissolution operation at a higher temperature (at which temperature the V(III) vanadium ion hydrate is prone to form an oxygen-bridge bond, leading to the production of polycondensation and thus a decreased electrolyte activity), and lack of an activation step; and the purity of the electrolyte is not high. Chinese patent CN103401010A discloses a method for preparing an all-vanadium redox flow battery electrolyte, which comprises: reducing $V_2O_5$ powder in hydrogen to prepare $V_{2O4}$ powder and $V_2O_3$ powder, dissolving $V_{2O4}$ and $V_2O_3$ in the concentrated sulfuric acid respectively to obtain the positive and negative electrode electrolytes of the vanadium battery. The main problem of the patent lies in that no specific reduction process is provided. The $V_{2O4}$ powder is prepared by reducing $V_2O_5$ in hydrogen, however, in the process, over-reduction or under-reduction is prone to occur and the process only can be achieved by precise control, but the patent does not provide measures about the precise control of reduction. In addition, the purity is low. Chinese patents CN101880059A and CN102557134A disclose a fluidized reduction furnace and reduction method for producing high-purity vanadium trioxide, wherein a heat transfer internal member is added in a fluidized bed to achieve the enhanced heat transfer; and cyclone preheating is used to increase the energy utilization rate and realize the efficient preparation of $V_2O_3$. However, since the systems do not have the function of precise control of reduction, the methods described in these two patents are only suitable for the preparation of $V_2O_3$ and not suitable for the preparation of other low-valence vanadium oxides.

In summary, there is an urgent need in the art to solve the disadvantages of the process and technology for preparation of the all-vanadium redox flow battery electrolyte, so as to simplify the preparation process, increase the purity of the electrolyte, and improve the simplicity of electrolyte preparation and use.

SUMMARY

In view of the above problems, the present invention proposes a system and method for producing a 3.5-valence high-purity vanadium electrolyte, to simplify the preparation process, increase the purity of the electrolyte and improve the simplicity of electrolyte preparation. In order to achieve these objectives, the present invention adopts the following technical solutions.

The present invention provides a system for producing a 3.5-valence high-purity vanadium electrolyte, comprising a vanadium oxytrichloride storage tank 1, a gas phase hydrolysis fluidized bed 2, a vanadium pentoxide feeding device 3, a preheat dedusting device 4, a reduction fluidized bed 5, a primary cooling device 6, a secondary cooling device 7, a low-valence vanadium oxide feeding device 8, a dissolution and activation device 9, a tail gas washing absorber 10, an induced draft fan 11 and a chimney 12;

wherein the gas phase hydrolysis fluidized bed 2 comprises a vanadium oxytrichloride vaporizer 2-1, a clean water vaporizer 2-2, a chloride spray gun 2-3, a gas phase hydrolysis fluidized bed body 2-4, a hydrolysis fluidized bed discharger 2-5, and a hydrochloric acid tail gas absorber 2-6;

the vanadium pentoxide feeding device 3 comprises a vanadium pentoxide hopper 3-1 and a vanadium pentoxide screw feeder 3-2;

the preheat dedusting device 4 comprises a venturi preheater 4-1, a first cyclone separator 4-2, a cyclone preheater 4-3, and a bag-type dust collector 4-4;

the reduction fluidized bed 5 comprises a feeder 5-1, a bed body 5-2, a discharger 5-3, a gas heater 5-4, a gas purifier 5-5, and a cyclone dust collector 5-6;

the primary cooling device 6 comprises a venturi cooler 6-1, a second cyclone separator 6-2 and a cyclone cooler 6-3;

the low-valence vanadium oxide feeding device 8 comprises a low-valence vanadium oxide hopper 8-1 and a low-valence vanadium oxide screw feeder 8-2;

the dissolution and activation device 9 comprises a stirring and dissolving device 9-1 and a microwave activation device 9-2;

wherein a feed outlet at the bottom of the vanadium oxytrichloride storage tank 1 is connected with an inlet of the vanadium oxytrichloride vaporizer 2-1 through a pipeline; the inlet of the vanadium oxytrichloride vaporizer 2-1 is connected with a purified nitrogen gas main pipe through a pipeline; a gas outlet of the vanadium oxytrichloride vaporizer 2-1 is connected with a gas inlet of the chloride spray gun 2-3 through a pipeline; an inlet of the clean water vaporizer 2-2 is connected with a clean water main pipe and a purified air main pipe through pipelines, respectively; a gas outlet of the clean water vaporizer 2-2 is connected with a gas inlet at the bottom of the gas phase hydrolysis fluidized bed body 2-4 through a pipeline; a gas outlet at the top of the expansion section of the gas phase hydrolysis fluidized bed body 2-4 is connected with a gas inlet of the hydrochloric acid tail gas absorber 2-6 through a pipeline; a hydrochloric acid solution outlet is provided at the bottom of the hydrochloric acid tail gas absorber 2-6; a gas outlet of the hydrochloric acid tail gas absorber 2-6 is connected with a gas inlet of the tail gas washing absorber 10 through a pipeline; a feed outlet at the upper part of the gas phase hydrolysis fluidized bed body 2-4 is connected with a feed inlet of the hydrolysis fluidized bed discharger 2-5 through a pipeline; an aeration air inlet of the hydrolysis fluidized bed discharger 2-5 is connected with the purified nitrogen gas main pipe through a pipeline; and a feed outlet of the hydrolysis fluidized bed discharger 2-5 is connected with a feed inlet of the vanadium pentoxide hopper 3-1 through a pipeline;

a feed outlet at the bottom of the vanadium pentoxide hopper 3-1 is connected with a feed inlet of the vanadium pentoxide screw feeder 3-2; and a feed outlet of the vanadium pentoxide screw feeder 3-2 is connected with a feed inlet of the venturi preheater 4-1 through a pipeline;

a feed outlet of the venturi preheater 4-1 is connected with a feed inlet of the first cyclone separator 4-2 through a pipeline; a gas outlet of the first cyclone separator 4-2 is connected with a gas inlet of the bag-type dust collector 4-4 through a pipeline; a feed outlet of the first cyclone separator 4-2 is connected with a gas inlet of the cyclone preheater 4-3 through a pipeline; a gas outlet of the bag-type dust collector 4-4 is connected with a gas inlet of the tail gas washing absorber 10 through a pipeline; a fine powder outlet of the bag-type dust collector 4-4 is connected with the gas inlet of the cyclone preheater 4-3 through a pipeline; the gas inlet of the cyclone preheater 4-3 is connected with a gas outlet of the cyclone dust collector 5-6 through a pipeline; a gas outlet of the cyclone preheater 4-3 is connected with a gas inlet of the venturi preheater 4-1 through a pipeline; and a feed outlet of the cyclone preheater 4-3 is connected with a feed inlet of the feeder 5-1 through a pipeline;

a feed outlet of the feeder 5-1 is connected with a feed inlet of the bed body 5-2 through a pipeline; an aeration air inlet of the feeder 5-1 is connected with the purified nitrogen gas main pipe; a gas inlet of the bed body 5-2 is connected with a gas outlet of the gas heater 5-4 through a pipeline; a vertical baffle is provided in the bed body 5-2; a feed outlet of the bed body 5-2 is connected with a feed inlet of the discharger 5-3 through a pipeline; a gas outlet of the bed body 5-2 is connected with a gas inlet of the cyclone dust collector 5-6 through a pipeline; the gas outlet of the cyclone dust collector 5-6 is connected with the gas inlet of the cyclone preheater 4-3 through a pipeline; a feed outlet of the cyclone dust collector 5-6 is connected with the feed inlet of the discharger 5-3 through a pipeline; a feed outlet of the discharger 5-3 is connected with a feed inlet of the venturi cooler 6-1 through a pipeline; an aeration air inlet of the discharger 5-3 is connected with the purified nitrogen gas main pipe; the gas outlet of the gas heater 5-4 is connected with the gas inlet of the bed body 5-2 through a pipeline; a gas inlet of the gas heater 5-4 is connected with a gas outlet of the gas purifier 5-5 and a gas outlet of the second cyclone separator 6-2 through pipelines, respectively; a fuel inlet of the gas heater 5-4 is connected with a fuel main pipe through a pipeline; a combustion air inlet of the gas heater 5-4 is connected with a compressed air main pipe through a pipeline; and a gas inlet of the gas purifier 5-5 is connected with a reducing gas main pipe through a pipeline;

the feed inlet of the venturi cooler 6-1 is connected with a feed outlet of the discharger 5-3; a gas inlet of the venturi cooler 6-1 is connected with a gas outlet of the cyclone cooler 6-3 through a pipeline; a gas outlet of the venturi cooler 6-1 is connected with a gas inlet of the second cyclone separator 6-2 through a pipeline; the gas outlet of the second cyclone separator 6-2 is connected with a gas inlet of the gas heater 5-4 through a pipeline; a feed outlet of the second cyclone separator 6-2 is connected with a gas inlet of the cyclone cooler 6-3; the gas inlet of the cyclone cooler 6-3 is connected with the purified nitrogen gas main pipe; the gas outlet of the cyclone cooler 6-3 is connected with the gas inlet of the venturi cooler 6-1 through a pipeline; and a feed outlet of the cyclone cooler 6-3 is connected with a feed inlet of the secondary cooling device 7 through a pipeline;

the feed inlet of the secondary cooling device 7 is connected with the feed outlet of the cyclone cooler 6-3 through a pipeline; a feed outlet of the secondary cooling device 7 is connected with a feed inlet of the low-valence vanadium oxide hopper 8-1 through a pipeline; a water inlet of the secondary cooling device 7 is connected with a process water main pipe through a pipeline; and a water outlet of the secondary cooling device 7 is connected with a water inlet of a water cooling system through a pipeline;

a feed outlet at the bottom of the low-valence vanadium oxide hopper 8-1 is connected with a feed inlet of the low-valence vanadium oxide screw feeder 8-2; and a feed outlet of the low-valence vanadium oxide screw feeder 8-2 is connected with a feed inlet of the dissolution and activation device 9 through a pipeline;

a clean water inlet of the stirring and dissolving device 9-1 is connected with the clean water main pipe through a pipeline; a sulfuric acid solution inlet of the stirring and dissolving device 9-1 is connected with a sulfuric acid solution main pipe through a pipeline; a gas outlet of the stirring and dissolving device 9-1 is connected with a gas inlet of the tail gas washing absorber 10 through a pipeline; and the stirring and dissolving device 9-1 is placed inside the microwave activation device 9-2;

a gas outlet of the tail gas washing absorber 10 is connected with a gas inlet of the induced draft fan 11 through a pipeline; and a gas outlet of the induced draft fan 11 is connected with a gas inlet at the bottom of the chimney 12 through a pipeline.

The present invention further provides a method for producing a 3.5-valence high-purity vanadium electrolyte based on the above system, which comprises the following steps:

allowing vanadium oxytrichloride in the vanadium oxytrichloride storage tank 1 and nitrogen gas from the purified nitrogen gas main pipe to be vaporized and preheated by the vanadium oxytrichloride vaporizer 2-1, and then enter the gas phase hydrolysis fluidized bed body 2-4 through the chloride spray gun 2-3; allowing clean water and purified air to be vaporized and preheated by the clean water vaporizer 2-2, and then be transmitted to the gas phase hydrolysis fluidized bed body 2-4, such that vanadium oxytrichloride is hydrolyzed and the powder material is kept at a fluidized state, to form vanadium pentoxide powder and hydrolysis flue gas rich in hydrogen chloride; discharging the vanadium pentoxide powder into the vanadium pentoxide hopper 3-1 through the hydrolysis fluidized bed discharger 2-5; and allowing the hydrolysis flue gas to be subjected to dust removing by the expansion section of the gas phase hydrolysis fluidized bed body 2-4, and then enter the hydrochloric acid tail gas absorber 2-6 for absorption treatment to form a by-product of hydrochloric acid solution, and transmitting the tail gas after absorption into the tail gas washing absorber 10 for treatment;

allowing vanadium pentoxide in the vanadium pentoxide hopper 3-1 to enter the vanadium pentoxide screw feeder 3-2, the venturi preheater 4-1, the first cyclone separator 4-2 and the cyclone preheater 4-3 in turn, and then enter the bed body 5-2 through the feeder 5-1 together with the fine powder particles recovered by the bag-type dust collector 4-4; allowing purified nitrogen gas to be preheated by the cyclone cooler 6-3, the venturi cooler 6-1 and the second cyclone separator 6-2 in turn and then be mixed with the purified reducing gas from the gas purifier 5-5, and be preheated again by the gas heater 5-4 and then enter the bed body 5-2, such that the vanadium pentoxide powder material is kept at a fluidized state and reduced to obtain low-valence vanadium oxide powder and reduction flue gas; allowing the low-valence vanadium oxide to be discharged from the feed outlet of the bed body 5-2, and enter the discharger 5-3, the venturi cooler 6-1, the second cyclone separator 6-2, the cyclone cooler 6-3, and the secondary cooling device 7 in turn together with the fine powder recovered by the cyclone dust collector 5-6 to be cooled, and then enter the low-valence vanadium oxide hopper 8-1; allowing the reduction flue gas in the bed body 5-2 to enter the cyclone dust collector 5-6, the cyclone preheater 4-3, the venturi preheater 4-1 and the first cyclone separator 4-2 in turn, and be subjected to dust removing by the bag-type dust collector 4-4 and then enter the tail gas washing absorber 10, and transmitting the gas discharged after alkaline solution absorption treatment to the chimney 12 through the induced draft fan 11, such that the gas is emptied;

allowing the low-valence vanadium oxide in the low-valence vanadium oxide hopper 8-1 to enter the stirring and dissolving device 9-1 through the low-valence vanadium oxide screw feeder 8-2, and undergo dissolution reaction together with clean water from the clean water main pipe and a sulfuric acid solution from the sulfuric acid solution main pipe under microwave field provided by the microwave activation device 9-2, to obtain the high-purity vanadium electrolyte, wherein the produced acid mist gas is transmitted to the tail gas washing absorber 10 for treatment.

The first characteristic of the present invention lies in that: the raw material of vanadium oxytrichloride has a purity of 99%-99.9999%, i.e., 2N-6N.

The second characteristic of the present invention lies in that: in the vanadium oxytrichloride vaporizer 2-1, the operation temperature is 40-600° C., and the molar ratio of nitrogen gas to vanadium oxytrichloride is 0.10-10.00 in the vaporization.

The third characteristic of the present invention lies in that: in the clean water vaporizer 2-2, the operation temperature is 40-600° C., and the mass ratio of air to water is 0.10-10.00 in the vaporization.

The fourth characteristic of the present invention lies in that: in the gas phase hydrolysis fluidized bed body 2-4, the vanadium pentoxide powder is directly prepared by gas phase hydrolysis of vanadium oxytrichloride, wherein the mass ratio of steam to vanadium oxytrichloride introduced is 0.10-10.00 during the gas phase hydrolysis, and the operation temperature is 100-600° C. and the average residence time of the powder is 15-300 min in the gas phase hydrolysis.

The fifth characteristic of the present invention lies in that: in the reduction fluidized bed body 5-2, the operation temperature is 400-700° C. in the reduction, and after the reducing gas is purified by the purifier 5-5, the content of organic substances is less than 1 mg/Nm$^3$, the total solid particle content is less than 2 mg/Nm$^3$, the volume fraction of the reducing gas in the mixed gas of the introduced nitrogen gas and reducing gas is 10%-90%, and the average residence time of the powder is 30-90 min.

The sixth characteristic of the present invention lies in that: the sulfuric acid solution is a sulfuric acid solution having an electronic-grade purity and a molar concentration of 4.0-10.0 mol/L.

The seventh characteristic of the present invention lies in that: the high-purity vanadium electrolyte is a mixed vanadium electrolyte with the molar concentration ratio of vanadium ions V(III) to V(IV) of 1:1, and the average valence of vanadium ions is 3.5. The resultant 3.5-valence high-purity vanadium electrolyte can be directly used in a new all-vanadium redox flow battery stack.

The eighth characteristic of the present invention lies in that: in the dissolution and activation device 9, microwave field is applied externally to assist dissolution of the low-valence vanadium oxide and activate the vanadium ions, wherein the dissolution and activation time is 30-300 minutes, the dissolution and activation temperature is 20-45° C., the microwave power density is 10-300 W/L, and the microwave frequency is 2450 MHz or 916 MHz.

The electrolyte produced by the present invention is of high purity, high activity and convenient electrolyte preparation and use. The present invention has the following outstanding advantages over the prior art:

(1) High purity: vanadium oxytrichloride which is easy to be highly purified is used as a raw material, and it is easy to obtain high-purity vanadium oxytrichloride with a purity of 2N-6N. Taking 5N vanadium oxytrichloride for example, a low-valence vanadium oxide with a purity of 4N5 (i.e., a purity of 99.995%) can be prepared by the present invention, and therefore a high-purity vanadium electrolyte can be formulated. In addition to the effective components, the total impurity content is lower than 5 ppm.

(2) Fluidized gas phase hydrolysis: the process is short and the production is large, which is convenient for industrial application.

(3) Precise control of reduction: a rectangular multi-bin fluidized bed is used to achieve precise control over reduction of the valence state.

(4) Realizing the sensible heat utilization of the high-temperature tail gas and high-temperature reduction product in the fluidized bed: the high-temperature tail gas discharged from the reduction fluidized bed is in direct contact with the cold vanadium-containing material, such that the cold vanadium-containing material is heated while the sensible heat of the high-temperature reduction tail gas is recovered; the purified nitrogen gas for reduction is in direct contact with the discharged high-temperature low-valence vanadium oxide product, such that the purified nitrogen gas is preheated while the reduction product is cooled to recover the sensible heat of the high-temperature reduction product.

(5) Achieving the open circulation of ultrafine powder: the tail gas from the reduction fluidized bed is passed through an external cyclone separator, and the recovered powder enters the reduction fluidized bed discharger, thereby realizing the open circulation of the fine powder particles and avoiding the closed circulation of the fine powder particles.

(6) High activity: the special chemical effect of microwave field is used to promote the dissolution of the vanadium oxide and activate the vanadium ions, so as to implement the preparation of the electrolyte in a low temperature range (20-45° C.), which significantly improves the activity of the electrolyte.

(7) Convenient transportation: the process for producing the electrolyte is short, and suitable for on-site configuration of vanadium batteries, and the low-valence vanadium oxide can be transported, thereby greatly reducing the transportation cost.

(8) 3.5-valence electrolyte: the electrolyte is suitable for configuration of a new vanadium battery stack, and can be directly added to positive and negative electrode chambers for use, which is simple to operate.

The present invention has the advantages of low energy consumption in production and low operation cost, high product purity, stable quality, simple electrolyte preparation and assembly and so on, and is suitable for the large-scale industrial production of the all-vanadium redox flow battery electrolyte, with good economic and social benefits.

BRIEF DESCRIPTION OF THE DRAWINGS

The accompanying drawing is used to provide further illustration of the present invention and constitutes a part of the specification. It is used to explain the present invention together with the examples of the present invention, rather than limit the present invention.

FIG. 1 is a schematic diagram illustrating the configuration of a system for producing a 3.5-valence high-purity electrolyte according to the present invention.

DETAILED DESCRIPTION OF THE EMBODIMENTS

In order to make the object, technical solution, and advantages of the present invention be clearer, the technical solution in the examples of the present invention will be described clearly and completely below with reference to the accompanying drawing of the present invention. Obviously, the described examples are only a part of the examples of the present invention, not all examples. It is worth noting that the examples are merely used for illustrating the technical solution of the present invention, rather than limiting the present invention.

FIG. 1 includes the following desginators:
1 Vanadium oxytrichloride storage tank
2 Gas phase hydrolysis fluidized bed
2-1 Vanadium oxytrichloride vaporizer
2-2 Clean water vaporizer
2-3 Chloride spray gun
2-4 Gas phase hydrolysis fluidized bed body
2-5 Hydrolysis fluidized bed discharger
2-6 Hydrochloric acid tail gas absorber
3 Vanadium pentoxide feeding device
3-1 Vanadium pentoxide hopper
3-2 Vanadium pentoxide screw feeder
4 Preheat dedusting device
4-1 Venturi preheater
4-2 First cyclone separator
4-3 Cyclone preheater
4-4 Bag-type dust collector
5 Reduction fluidized bed
5-1 Feeder
5-2 Bed body
5-3 Discharger
5-4 Gas heater
5-5 Gas purifier
5-6 Cyclone dust collector
6 Primary cooling device
6-1 Venturi cooler
6-2 Second cyclone separator
6-3 Cyclone cooler
8 Low-valent vanadium oxide feeding device
8-1 Low-valent vanadium oxide hopper
8-2 Low-valent vanadium oxide screw feeder
9 Dissolution and activation device
9-1 Stirring and dissolving device
9-2 Microwave activation device
10 Tail gas washing absorber
11 Induced draft fan
12 Chimney Example 1

With reference to FIG. 1, the system for producing a 3.5-valence high-purity vanadium electrolyte used in this example comprises a vanadium oxytrichloride storage tank 1, a gas phase hydrolysis fluidized bed 2, a vanadium pentoxide feeding device 3, a preheat dedusting device 4, a reduction fluidized bed 5, a primary cooling device 6, a secondary cooling device 7, a low-valence vanadium oxide feeding device 8, a dissolution and activation device 9, a tail gas washing absorber 10, an induced draft fan 11 and a chimney 12.

The gas phase hydrolysis fluidized bed 2 comprises a vanadium oxytrichloride vaporizer 2-1, a clean water vaporizer 2-2, a chloride spray gun 2-3, a gas phase hydrolysis fluidized bed body 2-4, a hydrolysis fluidized bed discharger 2-5, and a hydrochloric acid tail gas absorber 2-6.

The vanadium pentoxide feeding device 3 comprises a vanadium pentoxide hopper 3-1 and a vanadium pentoxide screw feeder 3-2.

The preheat dedusting device 4 comprises a venturi preheater 4-1, a first cyclone separator 4-2, a cyclone preheater 4-3, and a bag-type dust collector 4-4.

The reduction fluidized bed 5 comprises a feeder 5-1, a bed body 5-2, a discharger 5-3, a gas heater 5-4, a gas purifier 5-5, and a cyclone dust collector 5-6.

The primary cooling device 6 comprises a venturi cooler 6-1, a second cyclone separator 6-2 and a cyclone cooler 6-3.

The low-valence vanadium oxide feeding device 8 comprises a low-valence vanadium oxide hopper 8-1 and a low-valence vanadium oxide screw feeder 8-2.

The dissolution and activation device 9 comprises a stirring and dissolving device 9-1 and a microwave activation device 9-2.

A feed outlet at the bottom of the vanadium oxytrichloride storage tank 1 is connected with an inlet of the vanadium oxytrichloride vaporizer 2-1 through a pipeline; the inlet of the vanadium oxytrichloride vaporizer 2-1 is connected with a purified nitrogen gas main pipe through a pipeline; a gas outlet of the vanadium oxytrichloride vaporizer 2-1 is connected with a gas inlet of the chloride spray gun 2-3 through a pipeline; an inlet of the clean water vaporizer 2-2 is connected with a clean water main pipe and a purified air main pipe through pipelines, respectively; a gas outlet of the clean water vaporizer 2-2 is connected with a gas inlet at the bottom of the gas phase hydrolysis fluidized bed body 2-4 through a pipeline; a gas outlet at the top of the expansion section of the gas phase hydrolysis fluidized bed body 2-4 is connected with a gas inlet of the hydrochloric acid tail gas absorber 2-6 through a pipeline; a hydrochloric acid solution outlet is provided at the bottom of the hydrochloric acid tail gas absorber 2-6; a gas outlet of the hydrochloric acid tail gas absorber 2-6 is connected with a gas inlet of the tail gas washing absorber 10 through a pipeline; a feed outlet at the upper part of the gas phase hydrolysis fluidized bed body 2-4 is connected with a feed inlet of the hydrolysis fluidized bed discharger 2-5 through a pipeline; an aeration air inlet of the hydrolysis fluidized bed discharger 2-5 is connected with the purified nitrogen gas main pipe through a pipeline; and a feed outlet of the hydrolysis fluidized bed discharger 2-5 is connected with a feed inlet of the vanadium pentoxide hopper 3-1 through a pipeline.

A feed outlet at the bottom of the vanadium pentoxide hopper 3-1 is connected with a feed inlet of the vanadium pentoxide screw feeder 3-2; and a feed outlet of the vanadium pentoxide screw feeder 3-2 is connected with a feed inlet of the venturi preheater 4-1 through a pipeline.

A feed outlet of the venturi preheater 4-1 is connected with a feed inlet of the first cyclone separator 4-2 through a pipeline; a gas outlet of the first cyclone separator 4-2 is connected with a gas inlet of the bag-type dust collector 4-4 through a pipeline; a feed outlet of the first cyclone separator 4-2 is connected with a gas inlet of the cyclone preheater 4-3 through a pipeline; a gas outlet of the bag-type dust collector 4-4 is connected with a gas inlet of the tail gas washing absorber 10 through a pipeline; a fine powder outlet of the bag-type dust collector 4-4 is connected with the gas inlet of the cyclone preheater 4-3 through a pipeline; the gas inlet of the cyclone preheater 4-3 is connected with a gas outlet of the cyclone dust collector 5-6 through a pipeline; a gas outlet of the cyclone preheater 4-3 is connected with a gas inlet of the venturi preheater 4-1 through a pipeline; and a feed outlet of the cyclone preheater 4-3 is connected with a feed inlet of the feeder 5-1 through a pipeline.

A feed outlet of the feeder 5-1 is connected with a feed inlet of the bed body 5-2 through a pipeline; an aeration air inlet of the feeder 5-1 is connected with the purified nitrogen gas main pipe; a gas inlet of the bed body 5-2 is connected with a gas outlet of the gas heater 5-4 through a pipeline; a vertical baffle is provided in the bed body 5-2; a feed outlet of the bed body 5-2 is connected with a feed inlet of the discharger 5-3 through a pipeline; a gas outlet of the bed body 5-2 is connected with a gas inlet of the cyclone dust collector 5-6 through a pipeline; the gas outlet of the cyclone dust collector 5-6 is connected with the gas inlet of the cyclone preheater 4-3 through a pipeline; a feed outlet of the cyclone dust collector 5-6 is connected with the feed inlet of the discharger 5-3 through a pipeline; a feed outlet of the discharger 5-3 is connected with a feed inlet of the venturi cooler 6-1 through a pipeline; an aeration air inlet of the discharger 5-3 is connected with the purified nitrogen gas main pipe; the gas outlet of the gas heater 5-4 is connected with the gas inlet of the bed body 5-2 through a pipeline; a gas inlet of the gas heater 5-4 is connected with a gas outlet of the gas purifier 5-5 and a gas outlet of the second cyclone separator 6-2 through pipelines, respectively; a fuel inlet of the gas heater 5-4 is connected with a fuel main pipe through a pipeline; a combustion air inlet of the gas heater 5-4 is connected with a compressed air main pipe through a pipeline; and a gas inlet of the gas purifier 5-5 is connected with a reducing gas main pipe through a pipeline.

The feed inlet of the venturi cooler 6-1 is connected with a feed outlet of the discharger 5-3; a gas inlet of the venturi cooler 6-1 is connected with a gas outlet of the cyclone cooler 6-3 through a pipeline; a gas outlet of the venturi cooler 6-1 is connected with a gas inlet of the second cyclone separator 6-2 through a pipeline; the gas outlet of the second cyclone separator 6-2 is connected with a gas inlet of the gas heater 5-4 through a pipeline; a feed outlet of the second cyclone separator 6-2 is connected with a gas inlet of the cyclone cooler 6-3; the gas inlet of the cyclone cooler 6-3 is connected with the purified nitrogen gas main pipe; the gas outlet of the cyclone cooler 6-3 is connected with the gas inlet of the venturi cooler 6-1 through a pipeline; and a feed outlet of the cyclone cooler 6-3 is connected with a feed inlet of the secondary cooling device 7 through a pipeline.

The feed inlet of the secondary cooling device 7 is connected with the feed outlet of the cyclone cooler 6-3 through a pipeline; a feed outlet of the secondary cooling device 7 is connected with a feed inlet of the low-valence vanadium oxide hopper 8-1 through a pipeline; a water inlet of the secondary cooling device 7 is connected with a process water main pipe through a pipeline; and a water outlet of the secondary cooling device 7 is connected with a water inlet of a water cooling system through a pipeline.

A feed outlet at the bottom of the low-valence vanadium oxide hopper 8-1 is connected with a feed inlet of the low-valence vanadium oxide screw feeder 8-2; and a feed outlet of the low-valence vanadium oxide screw feeder 8-2 is connected with a feed inlet of the dissolution and activation device 9 through a pipeline.

A clean water inlet of the stirring and dissolving device 9-1 is connected with the clean water main pipe through a pipeline; a sulfuric acid solution inlet of the stirring and dissolving device 9-1 is connected with a sulfuric acid solution main pipe through a pipeline; a gas outlet of the stirring and dissolving device 9-1 is connected with a gas inlet of the tail gas washing absorber 10 through a pipeline; and the stirring and dissolving device 9-1 is placed inside the microwave activation device 9-2.

A gas outlet of the tail gas washing absorber 10 is connected with a gas inlet of the induced draft fan 11 through a pipeline; and a gas outlet of the induced draft fan 11 is connected with a gas inlet at the bottom of the chimney 12 through a pipeline.

Example 2

The above system is used in this example to produce a 3.5-valence high-purity vanadium electrolyte. The method specifically comprises the following steps.

Vanadium oxytrichloride in the vanadium oxytrichloride storage tank 1 and nitrogen gas from the purified nitrogen gas main pipe are vaporized and preheated by the vanadium oxytrichloride vaporizer 2-1, and then enter the gas phase hydrolysis fluidized bed body 2-4 through the chloride spray gun 2-3. Clean water and purified air are vaporized and preheated by the clean water vaporizer 2-2, and then transmitted to the gas phase hydrolysis fluidized bed body 2-4, such that vanadium oxytrichloride is hydrolyzed and the powder material is kept at a fluidized state, to form vanadium pentoxide powder and hydrolysis flue gas rich in hydrogen chloride. The vanadium pentoxide powder is discharged into the vanadium pentoxide hopper 3-1 through the hydrolysis fluidized bed discharger 2-5. The hydrolysis flue gas is subjected to dust removing by the expansion section of the gas phase hydrolysis fluidized bed body 2-4, and then enters the hydrochloric acid tail gas absorber 2-6 for absorption treatment to form a by-product of hydrochloric acid solution, and the tail gas after absorption is transmitted into the tail gas washing absorber 10 for treatment;

Vanadium pentoxide in the vanadium pentoxide hopper 3-1 enters the vanadium pentoxide screw feeder 3-2, the venturi preheater 4-1, the first cyclone separator 4-2 and the cyclone preheater 4-3 in turn, and then enters the bed body 5-2 through the feeder 5-1 together with the fine powder particles recovered by the bag-type dust collector 4-4. Purified nitrogen gas is preheated by the cyclone cooler 6-3, the venturi cooler 6-1 and the second cyclone separator 6-2 in turn and then is mixed with the purified reducing gas from the gas purifier 5-5, and is preheated again by the gas heater 5-4 and then enters the bed body 5-2, such that the vanadium pentoxide powder material is kept at a fluidized state and reduced to obtain low-valence vanadium oxide powder and reduction flue gas. The low-valence vanadium oxide is discharged from the feed outlet of the bed body 5-2, and enters the discharger 5-3, the venturi cooler 6-1, the second cyclone separator 6-2, the cyclone cooler 6-3, and the secondary cooling device 7 in turn together with the fine powder recovered by the cyclone dust collector 5-6 to be cooled, and then enters the low-valence vanadium oxide hopper 8-1. The reduction flue gas in the bed body 5-2 enters the cyclone dust collector 5-6, the cyclone preheater 4-3, the venturi preheater 4-1 and the first cyclone separator 4-2 in turn, and is subjected to dust removing by the bag-type dust collector 4-4 and then enters the tail gas washing absorber 10, and the gas discharged after alkaline solution absorption treatment is transmitted to the chimney 12 through the induced draft fan 11, such that the gas is emptied;

The low-valence vanadium oxide in the low-valence vanadium oxide hopper 8-1 enters the stirring and dissolving device 9-1 through the low-valence vanadium oxide screw feeder 8-2, and undergoes dissolution reaction together with clean water from the clean water main pipe and a sulfuric acid solution from the sulfuric acid solution main pipe under microwave field provided by the microwave activation device 9-2, to obtain the high-purity vanadium electrolyte, wherein the produced acid mist gas is transmitted to the tail gas washing absorber 10 for treatment.

Example 3

In this example, vanadium oxytrichloride (with a purity of above 2N) was used as a raw material, and the throughput was 3 kg/h. In the vanadium oxytrichloride vaporizer 2-1, the operation temperature was 40° C., and the molar ratio of nitrogen gas to vanadium oxytrichloride was 10:1 in the vaporization. In the clean water vaporizer 2-2, the operation temperature was 40° C., and the mass ratio of air to water was 10:1 in the vaporization. In the gas phase hydrolysis fluidized bed body 2-4, the mass ratio of the steam to vanadium oxytrichloride introduced was 10:1 during the gas phase hydrolysis, the operation temperature was 100° C. and the average residence time of the powder was 300 min in the gas phase hydrolysis, and vanadium pentoxide was obtained. In the reduction fluidized bed 5, the reducing gas introduced into the bed body 5-2 was hydrogen gas, the volume fraction of hydrogen gas in the mixed gas of the nitrogen gas and hydrogen gas introduced into the bed body 5-2 was 10%, the average residence time of the powder was 90 min, and the operation temperature was 400° C. in the reduction fluidized bed, and a low-valence vanadium oxide having an average vanadium valence of 3.5 and a purity of 98.5% was obtained. Under the condition of microwave field, a sulfuric acid solution (4.0 mol/L) and clean water (having a resistivity of 15.0 MΩ·cm) were added into the stirring and dissolving device 9-1, and the operation temperature was 20° C., and activation was conducted for 300 minutes with a microwave power density of 10 W/L and a microwave frequency of 916 MHz, to obtain a high-purity vanadium electrolyte with an average vanadium ion valence of 3.5 and a total impurity content of less than 0.5% (except for the effective components).

Example 4

In this example, vanadium oxytrichloride (with a purity of above 3N) was used as a raw material, and the throughput was 30 kg/h. In the vanadium oxytrichloride vaporizer 2-1, the operation temperature was 600° C., and the molar ratio of nitrogen gas to vanadium oxytrichloride was 1:10 in the vaporization. In the clean water vaporizer 2-2, the operation temperature was 600° C., and the mass ratio of air to water was 1:10 in the vaporization. In the gas phase hydrolysis fluidized bed body 2-4, the mass ratio of the steam to vanadium oxytrichloride introduced was 1:10 during the gas phase hydrolysis, the operation temperature was 600° C. and the average residence time of the powder was 15 min in the gas phase hydrolysis, and vanadium pentoxide was obtained. In the reduction fluidized bed 5, the reducing gas introduced into the bed body 5-2 was coal gas, the volume fraction of coal gas in the mixed gas of nitrogen gas and coal gas was 90%, the average residence time of the powder was 30 min, and the operation temperature was 700° C. in the reduction fluidized bed, and a low-valence vanadium oxide having an average vanadium valence of 3.5 and a purity of 99.5% was obtained. Under the condition of microwave field, a sulfuric acid solution (10.0 mol/L) and clean water (having a resistivity of 18.0 MΩ·cm) were added into the stirring and dissolving device 9-1, and the operation temperature was 45° C., and activation was conducted for 30 minutes with a microwave power density of 300 W/L and a microwave frequency of 2450 MHz, to obtain a high-purity vanadium electrolyte with an average vanadium ion valence of 3.5 and a total impurity content of less than 0.05% (except for the effective components).

Example 5

In this example, vanadium oxytrichloride (with a purity of above 4N) was used as a raw material, and the throughput was 300 kg/h. In the vanadium oxytrichloride vaporizer 2-1, the operation temperature was 200° C., and the molar ratio of nitrogen gas to vanadium oxytrichloride was 1:5 in the vaporization. In the clean water vaporizer 2-2, the operation temperature was 200° C., and the mass ratio of air to water was 1:5 in the vaporization. In the gas phase hydrolysis fluidized bed body 2-4, the mass ratio of the steam to vanadium oxytrichloride introduced was 1:5 during the gas phase hydrolysis, the operation temperature was 200° C. and the average residence time of the powder was 120 min in the gas phase hydrolysis, and vanadium pentoxide was obtained. In the reduction fluidized bed 5, the reducing gas introduced into the bed body 5-2 was coal gas, the volume fraction of coal gas in the mixed gas of nitrogen gas and coal gas was 80%, the average residence time of the powder was 45 min, and the operation temperature was 600° C. in the reduction fluidized bed, and a low-valence vanadium oxide having an average vanadium valence of 3.5 and a purity of 99.95% was obtained. Under the condition of microwave field, a sulfuric acid solution (8.0 mol/L) and clean water (having a resistivity of 18.0 MΩ·cm) were added into the stirring and dissolving device 9-1, and the operation temperature was 40° C., and activation was conducted for 180 minutes with a microwave power density of 200 W/L and a microwave frequency of 2450 MHz, to obtain a high-purity vanadium electrolyte with an average vanadium ion valence of 3.5 and a total impurity content of less than 0.005% (except for the effective components), which can be directly used for the configuration of a new vanadium battery stack.

Example 6

In this example, vanadium oxytrichloride (with a purity of above 5N) was used as a raw material, and the throughput was 3000 kg/h. In the vanadium oxytrichloride vaporizer 2-1, the operation temperature was 200° C., and the molar ratio of nitrogen gas to vanadium oxytrichloride was 1:1 in the vaporization. In the clean water vaporizer 2-2, the operation temperature was 200° C., and the mass ratio of air to water was 1:1 in the vaporization. In the gas phase hydrolysis fluidized bed body 2-4, the mass ratio of the steam to vanadium oxytrichloride introduced was 1:1 during the gas phase hydrolysis, the operation temperature was 200° C. and the average residence time of the powder was 60 min in the gas phase hydrolysis, and vanadium pentoxide was obtained. In the reduction fluidized bed 5, the reducing gas introduced into the bed body 5-2 was hydrogen gas, the volume fraction of coal gas in the mixed gas of nitrogen gas and hydrogen gas was 50%, the average residence time of the powder was 60 min, and the operation temperature was 500° C. in the reduction fluidized bed, and a low-valence vanadium oxide having an average vanadium valence of 3.5 and a purity of 4N5 (i.e., a purity of 99.995%) was obtained. Under the condition of microwave field, a sulfuric acid solution (6.0 mol/L) and clean water (having a resistivity of 18.0 MΩ·cm) were added into the stirring and dissolving device 9-1, and the operation temperature was 30° C., and activation was conducted for 120 minutes with a microwave power density of 100 W/L and a microwave frequency of 916 MHz, to obtain a high-purity vanadium electrolyte with an average vanadium ion valence of 3.5 and a total impurity content of less than 5 ppm (except for the effective components), which can be directly used for the configuration of a new vanadium battery stack.

Example 7

In this example, vanadium oxytrichloride (with a purity of above 6N) was used as a raw material, and the throughput was 3000 kg/h. In the vanadium oxytrichloride vaporizer 2-1, the operation temperature was 200° C., and the molar ratio of nitrogen gas to vanadium oxytrichloride was 1:1 in the vaporization. In the clean water vaporizer 2-2, the operation temperature was 200° C., and the mass ratio of air to water was 1:1 in the vaporization. In the gas phase hydrolysis fluidized bed body 2-4, the mass ratio of the steam to vanadium oxytrichloride introduced was 1:1 during the gas phase hydrolysis, the operation temperature was 200° C. and the average residence time of the powder was 60 min in the gas phase hydrolysis, and vanadium pentoxide was obtained. In the reduction fluidized bed 5, the reducing gas introduced into the bed body 5-2 was hydrogen gas, the volume fraction of coal gas in the mixed gas of nitrogen gas and hydrogen gas was 50%, the average residence time of the powder was 60 min, and the operation temperature was 500° C. in the reduction fluidized bed, and a low-valence vanadium oxide having an average vanadium valence of 3.5 and a purity of 5N5 (i.e., a purity of 99.9995%) was obtained. Under the condition of microwave field, a sulfuric acid solution (6.0 mol/L) and clean water (having a resistivity of 18.0 MΩ·cm) were added into the stirring and dissolving device 9-1, and the operation temperature was 30° C., and activation was conducted for 120 minutes with a microwave power density of 100 W/L and a microwave frequency of 916 MHz, to obtain a high-purity vanadium electrolyte with an average vanadium ion valence of 3.5 and a total impurity content of less than 1 ppm (except for the effective components), which can be directly used for the configuration of a new vanadium battery stack.

The contents which are not illustrated in detail in the present invention belong to the well-known technologies in the art.

Of course, the present invention can also provide a variety of examples. According to the disclosure of the present invention, those skilled in the art can make various corresponding changes and transformations without departing from the spirit and essence of the present invention. However, these corresponding changes and transformations shall all fall within the protection scope of the claims of the present invention.

What is claimed is:

1. A system for producing a 3.5-valence high-purity vanadium electrolyte, comprising a vanadium oxytrichloride storage tank, a gas phase hydrolysis fluidized bed, a vanadium pentoxide feeding device, a preheat dedusting device, a reduction fluidized bed, a primary cooling device, a secondary cooling device, a low-valence vanadium oxide feeding device a dissolution and activation device, a tail gas washing absorber, an induced draft fan and a chimney;

wherein the gas phase hydrolysis fluidized bed comprises a vanadium oxytrichloride vaporizer, a clean water vaporizer, a chloride spray gun, a gas phase hydrolysis fluidized bed body, a hydrolysis fluidized bed discharger, and a hydrochloric acid tail gas absorber;

the vanadium pentoxide feeding device comprises a vanadium pentoxide hopper and a vanadium pentoxide screw feeder;

the preheat dedusting device comprises a venturi preheater, a first cyclone separator, a cyclone preheater, and a bag-type dust collector;

the reduction fluidized bed comprises a feeder, a bed body, a discharger, a gas heater, a gas purifier, and a cyclone dust collector;

the primary cooling device comprises a venturi cooler, a second cyclone separator and a cyclone cooler;

the low-valence vanadium oxide feeding device comprises a low-valence vanadium oxide hopper and a low-valence vanadium oxide screw feeder;

the dissolution and activation device comprises a stirring and dissolving device and a microwave activation device;

wherein a feed outlet at the bottom of the vanadium oxytrichloride storage tank is connected with an inlet of the vanadium oxytrichloride vaporizer through a pipeline; the inlet of the vanadium oxytrichloride vaporizer is connected with a purified nitrogen gas main pipe through a pipeline; a gas outlet of the vanadium oxytrichloride vaporizer is connected with a gas inlet of the chloride spray gun through a pipeline; an inlet of the clean water vaporizer is connected with a clean water main pipe and a purified air main pipe through pipelines, respectively; a gas outlet of the clean water vaporizer is connected with a gas inlet at the bottom of the gas phase hydrolysis fluidized bed body through a pipeline; a gas outlet at the top of the expansion section of the gas phase hydrolysis fluidized bed body is connected with a gas inlet of the hydrochloric acid tail gas absorber through a pipeline; a hydrochloric acid solution outlet is provided at the bottom of the hydrochloric acid tail gas absorber; a gas outlet of the hydrochloric acid tail gas absorber is connected with a gas inlet of the tail gas washing absorber through a pipeline; a feed outlet at the upper part of the gas phase hydrolysis fluidized bed body is connected with a feed inlet of the hydrolysis fluidized bed discharger through a pipeline; an aeration air inlet of the hydrolysis fluidized bed discharger is connected with the purified nitrogen gas main pipe through a pipeline; and a feed outlet of the hydrolysis fluidized bed discharger is connected with a feed inlet of the vanadium pentoxide hopper through a pipeline;

a feed outlet at the bottom of the vanadium pentoxide hopper is connected with a feed inlet of the vanadium pentoxide screw feeder; and a feed outlet of the vanadium pentoxide screw feeder is connected with a feed inlet of the venturi preheater through a pipeline;

a feed outlet of the venturi preheater is connected with a feed inlet of the first cyclone separator through a pipeline; a gas outlet of the first cyclone separator is connected with a gas inlet of the bag-type dust collector through a pipeline; a feed outlet of the first cyclone separator is connected with a gas inlet of the cyclone preheater through a pipeline; a gas outlet of the bag-type dust collector is connected with a gas inlet of the tail gas washing absorber through a pipeline; a fine powder outlet of the bag-type dust collector is connected with the gas inlet of the cyclone preheater through a pipeline; the gas inlet of the cyclone preheater is connected with a gas outlet of the cyclone dust collector through a pipeline; a gas outlet of the cyclone preheater is connected with a gas inlet of the venturi preheater through a pipeline; and a feed outlet of the cyclone preheater is connected with a feed inlet of the feeder through a pipeline;

a feed outlet of the feeder is connected with a feed inlet of the bed body through a pipeline; an aeration air inlet of the feeder is connected with the purified nitrogen gas main pipe; a gas inlet of the bed body is connected with a gas outlet of the gas heater through a pipeline; a vertical baffle is provided in the bed body; a feed outlet of the bed body is connected with a feed inlet of the discharger through a pipeline; a gas outlet of the bed body is connected with a gas inlet of the cyclone dust collector through a pipeline; the gas outlet of the cyclone dust collector is connected with the gas inlet of the cyclone preheater through a pipeline; a feed outlet of the cyclone dust collector is connected with the feed inlet of the discharger through a pipeline; a feed outlet of the discharger is connected with a feed inlet of the venturi cooler through a pipeline; an aeration air inlet of the discharger is connected with the purified nitrogen gas main pipe; the gas outlet of the gas heater is connected with the gas inlet of the bed body through a pipeline; a gas inlet of the gas heater is connected with a gas outlet of the gas purifier and a gas outlet of the second cyclone separator through pipelines, respectively; a fuel inlet of the gas heater is connected with a fuel main pipe through a pipeline; a combustion air inlet of the gas heater is connected with a compressed air main pipe through a pipeline; and a gas inlet of the gas purifier is connected with a reducing gas main pipe through a pipeline;

the feed inlet of the venturi cooler is connected with a feed outlet of the discharger; a gas inlet of the venturi cooler is connected with a gas outlet of the cyclone cooler through a pipeline; a gas outlet of the venturi cooler is connected with a gas inlet of the second cyclone separator through a pipeline; the gas outlet of the second cyclone separator is connected with a gas inlet of the gas heater through a pipeline; a feed outlet of the second cyclone separator is connected with a gas inlet of the cyclone cooler; the gas inlet of the cyclone cooler is connected with the purified nitrogen gas main pipe; the gas outlet of the cyclone cooler is connected with the gas inlet of the venturi cooler through a pipeline; and a feed outlet of the cyclone cooler is connected with a feed inlet of the secondary cooling device through a pipeline;

the feed inlet of the secondary cooling device is connected with the feed outlet of the cyclone cooler through a pipeline; a feed outlet of the secondary cooling device is connected with a feed inlet of the low-valence vanadium oxide hopper through a pipeline; a water inlet of the secondary cooling device is connected with a process water main pipe through a pipeline; and a water outlet of the secondary cooling device is connected with a water inlet of a water cooling system through a pipeline;

a feed outlet at the bottom of the low-valence vanadium oxide hopper is connected with a feed inlet of the low-valence vanadium oxide screw feeder; and a feed outlet of the low-valence vanadium oxide screw feeder is connected with a feed inlet of the dissolution and activation device through a pipeline;

a clean water inlet of the stirring and dissolving device is connected with the clean water main pipe through a pipeline; a sulfuric acid solution inlet of the stirring and dissolving device is connected with a sulfuric acid solution main pipe through a pipeline; a gas outlet of the stirring and dissolving device is connected with a gas inlet of the tail gas washing absorber through a pipeline; and the stirring and dissolving device is placed inside the microwave activation device;

a gas outlet of the tail gas washing absorber is connected with a gas inlet of the induced draft fan through a pipeline; and a gas outlet of the induced draft fan is connected with a gas inlet at the bottom of the chimney through a pipeline.

2. A method for producing a 3.5-valence high-purity vanadium electrolyte according to the system of claim 1, comprising the following steps:

introducing vanadium oxytrichloride in the vanadium oxytrichloride storage tank and nitrogen gas from the purified nitrogen gas main pipe to be vaporized and preheated by the vanadium oxytrichloride vaporizer, and then enter the gas phase hydrolysis fluidized bed body through the chloride spray gun; clean water and purified air are vaporized and preheated by the clean water vaporizer, and then be transmitted to the gas phase hydrolysis fluidized bed body, such that vanadium oxytrichloride is hydrolyzed and the powder material is kept at a fluidized state, to form vanadium pentoxide powder and hydrolysis flue gas rich in hydrogen chloride; discharging the vanadium pentoxide powder into the vanadium pentoxide hopper through the hydrolysis fluidized bed discharger; and wherein the hydrolysis flue gas is subjected to dust removing by the expansion section of the gas phase hydrolysis fluidized bed body, and then enter the hydrochloric acid tail gas absorber for absorption treatment to form a by-product of hydrochloric acid solution, and transmitting the tail gas after absorption into the tail gas washing absorber for treatment;

introducing vanadium pentoxide in the vanadium pentoxide hopper to into the vanadium pentoxide screw feeder, the venturi preheater, the first cyclone separator and the cyclone preheater in turn, and then enter the bed body through the feeder together with the fine powder particles recovered by the bag-type dust collector; wherein purified nitrogen gas to be preheated by the cyclone cooler, the venturi cooler and the second cyclone separator in turn and then be mixed with the purified reducing gas from the gas purifier, and be preheated again by the gas heater and then enter the bed body, such that the vanadium pentoxide powder material is kept at a fluidized state and reduced to obtain low-valence vanadium oxide powder and reduction flue gas; wherein the low-valence vanadium oxide is discharged from the feed outlet of the bed body, and enter the discharger, the venturi cooler, the second cyclone separator, the cyclone cooler, and the secondary cooling device in turn together with the fine powder recovered by the cyclone dust collector to be cooled, and then enter the low-valence vanadium oxide hopper; wherein the reduction flue gas in the bed body is moved into the cyclone dust collector, the cyclone preheater, the venturi preheater and the first cyclone separator, to be subjected to dust removing by the bag-type dust collector and then moved into the tail gas washing absorber, and transmitting the gas discharged after alkaline solution absorption treatment to the chimney through the induced draft fan, such that the gas is emptied;

introducing the low-valence vanadium oxide in the low-valence vanadium oxide hopper into the stirring and dissolving device through the low-valence vanadium oxide screw feeder, and undergo dissolution reaction together with clean water from the clean water main pipe and a sulfuric acid solution from the sulfuric acid solution main pipe under microwave field provided by the microwave activation device, to obtain the high-purity vanadium electrolyte, wherein the produced acid mist gas is transmitted to the tail gas washing absorber for treatment.

3. The method for producing a 3.5-valence high-purity vanadium electrolyte according to claim 2, wherein the raw material of vanadium oxytrichloride has a purity of 99%-99.9999%.

4. The method for producing a 3.5-valence high-purity vanadium electrolyte according to claim 2, wherein in the vanadium oxytrichloride vaporizer, the operation temperature is 40-600° C., and the molar ratio of nitrogen gas to vanadium oxytrichloride is 0.10-10.00 in the vaporization.

5. The method for producing a 3.5-valence high-purity vanadium electrolyte according to claim 2, wherein in the clean water vaporizer, the operation temperature is 40-600° C., and the mass ratio of air to water is 0.10-10.00 in the vaporization.

6. The method for producing a 3.5-valence high-purity vanadium electrolyte according to claim 2, wherein in the gas phase hydrolysis fluidized bed body, the vanadium pentoxide powder is directly prepared by gas phase hydrolysis of vanadium oxytrichloride, wherein the mass ratio of steam to vanadium oxytrichloride introduced is 0.10-10.00 during the gas phase hydrolysis, and the operation temperature is 100-600° C. and the average residence time of the powder is 15-300 min in the gas phase hydrolysis.

7. The method for producing a 3.5-valence high-purity vanadium electrolyte according to claim 2, wherein in the reduction fluidized bed body, the operation temperature is 400-700° C. in the reduction, and after the reducing gas is purified by the purifier, the content of organic substances is less than 1 mg/Nm$^3$, the total solid particle content is less than 2 mg/Nm$^3$, the volume fraction of the reducing gas in the mixed gas of the introduced nitrogen gas and reducing gas is 10%-90%, and the average residence time of the powder is 30-90 min.

8. The method for producing a 3.5-valence high-purity vanadium electrolyte according to claim 2, wherein the sulfuric acid solution is a sulfuric acid solution having an electronic-grade purity and a molar concentration of 4.0-10.0 mol/L.

9. The method for producing a 3.5-valence high-purity vanadium electrolyte according to claim 2, wherein the high-purity vanadium electrolyte is a mixed vanadium electrolyte with the molar concentration ratio of vanadium ions V(III) to V(IV) of 1:1, and the average valence of vanadium ions is 3.5.

10. The method for producing a 3.5-valence high-purity vanadium electrolyte according to claim 2, wherein in the dissolution and activation device, microwave field is applied externally to assist dissolution of the low-valence vanadium oxide and activate the vanadium ions, wherein the dissolution and activation time is 30-300 minutes, the dissolution and activation temperature is 20-45° C., the microwave power density is 10-300 W/L, and the microwave frequency is 2450 MHz or 916 MHz.

* * * * *